(12) United States Patent
Moody et al.

(10) Patent No.: US 7,747,081 B2
(45) Date of Patent: *Jun. 29, 2010

(54) IDENTIFICATION OF A PHOTOELECTRIC SENSOR ARRAY

(75) Inventors: Ian Moody, Chelmsford (GB); Kevin Hadfield, Chelmsford (GB)

(73) Assignee: E2V Technologies (UK) Limited, Essex (GB)

( * ) Notice: Subject to any disclaimer, the term of this patent is extended or adjusted under 35 U.S.C. 154(b) by 1034 days.

This patent is subject to a terminal disclaimer.

(21) Appl. No.: 11/394,214

(22) Filed: Mar. 31, 2006

(65) Prior Publication Data

US 2006/0238630 A1     Oct. 26, 2006

(30) Foreign Application Priority Data

Mar. 31, 2005   (GB)   ................................. 0506566.9

(51) Int. Cl.
G06K 9/46 (2006.01)
G06K 9/66 (2006.01)
G06K 9/68 (2006.01)
H04N 9/64 (2006.01)

(52) U.S. Cl. ........................ 382/218; 382/190; 348/247

(58) Field of Classification Search ................. 382/168, 382/218, 190; 250/208.1; 348/246, 247, 348/311, 615

See application file for complete search history.

(56) References Cited

U.S. PATENT DOCUMENTS

| 5,606,365 | A | * | 2/1997 | Maurinus et al. | 348/222.1 |
| 6,092,195 | A | * | 7/2000 | Nguyen | 726/27 |
| 6,381,357 | B1 | * | 4/2002 | Tan et al. | 382/141 |
| 6,618,084 | B1 | * | 9/2003 | Rambaldi et al. | 348/247 |
| 6,819,358 | B1 | | 11/2004 | Kagle et al. | |
| 2004/0160520 | A1 | * | 8/2004 | Kubota et al. | 348/246 |
| 2004/0252874 | A1 | * | 12/2004 | Yamazaki | 382/132 |

FOREIGN PATENT DOCUMENTS

| EP | 0 917 132 A2 | 5/1999 |
| EP | 1 487 193 A1 | 12/2004 |

* cited by examiner

*Primary Examiner*—Yubin Hung
(74) *Attorney, Agent, or Firm*—Venable LLP; Robert Kinberg; Justine A. Gozzi (57) ABSTRACT

A photoelectric sensor array is labelled by accumulating charge, preferably charge from a dark current, in at least a portion of the sensor array and reading out the accumulated charge to form an image to determine locations of atypical pixels in the portion of the sensor array. A signature of the sensor array is generated from the locations of atypical pixels and stored. The array is subsequently identified by re-accumulating charge in the portion of the array to form a signature based on the atypical pixels for comparison with the stored signature.

22 Claims, 5 Drawing Sheets

IDENTIFICATION OF A PHOTOELECTRIC SENSOR ARRAY

CROSS-REFERENCE TO RELATED APPLICATION

This application claims the priority of British Patent Application No. 0506566.9 filed Mar. 31, 2005, the subject matter of which is being incorporated herein by reference.

FIELD OF THE INVENTION

This invention relates to identification of a photoelectric sensor array and in particular a CCD sensor array.

BACKGROUND OF THE INVENTION

Where a plurality of different sensors may be selectively connected to an imaging system, it is very desirable to be able to determine an identity of a connected sensor. For example, defect maps are typically provided with each sensor, indicating locations of atypical pixels so that readings from the atypical pixels can be corrected and it is necessary to know which sensor is connected in order to use a corresponding defect map. Thus, for example, U.S. Pat. No. 6,618,084-B1 discloses a method of determining the location of defective pixels in a sensor array, storing these locations in a memory associated with the sensor, for example on the same chip as a CMOS sensor, and making corrections for readings, or a lack of a reading, from defective pixels. In circumstances where a plurality of sensors may be connected to an imaging system, it is advantageous instead to store maps of the defects centrally, either in the imaging system or in a central database accessible remotely, and to identify the sensor connected to the imaging system so that a corresponding defect map may be used to correct an image generated by the connected sensor. For example, in dental x-ray imaging, a dental surgeon may select one of say three available x-ray sensors dependent, for example, on an area to be x-rayed or the size of a patient's oral cavity. At present, with a manual system, a dental surgeon has disadvantageously to divert his attention from a patient to key into a computer keyboard of an imaging system the identity of a sensor connected to the imaging system. It is preferable if the imaging system automatically identifies a sensor connected to the imaging system. It is known to use an EEPROM in association with a sensor, for example in series in a connector to the sensor, to provide an identifying signal to an imaging system to identify the sensor. However, use of an EEPROM adds undesirable cost and complexity to the sensor and is dependent on recognition by the imaging system of the identifying signal.

In summary, a known method of improving quality of a CCD image comprises storage of dark and bright/flat field image data, and the correction of dark and bright defects in subsequent images by appropriate processing using the stored data. In order to do this, known CCD drive or imaging systems either require: a fixed, single CCD array sensor with only one corresponding set of stored dark and flat field image data, manual selection of a particular CCD serial number, from a set of serial numbers, in order to retrieve the appropriate dark and flat field data or automatic selection of a particular CCD serial number by reading an EEPROM incorporated into a CCD connector, in order to retrieve the appropriate dark and flat field data.

It would be advantageous to be able to identify a sensor uniquely and automatically from a set of sensors to apply corrections, without the use of a EEPROM.

It would also be advantageous to be able to identify a sensor uniquely for warranty purposes, for example, to determine whether a particular sensor is covered by a particular manufacturer's or supplier's warranty.

SUMMARY OF THE INVENTION

According to a first aspect of the invention, there is provided an identification device (identification means) for a sensor array of photoelectric devices comprising: a read-out device (read-out means) to read out accumulated charge from at least a portion of the sensor away to form an image; a feature extractor (feature extraction means) to determine, from the image, features of the sensor array comprising at least one of locations of atypical pixels and relative gray levels corresponding to the atypical pixels, in the at least a portion of the sensor array; a signature generator (signature generation means) to generate a storable signature of the sensor away from the features of the sensor array; storage (storage means) for storing the storable signature and a comparator (comparison means) to compare the stored signature with a subsequently generated signature for subsequent identification of the sensor array.

Conveniently, the identification means is arranged to accumulate charge from a dark current.

Advantageously, the identification means is arranged to increase dark current by at least one of adjusting bias levels applied to the sensor array, increasing a Conveniently, the identification means is arranged to determine locations of atypical pixels by subtracting a baseline black level and a dark current floor from the image.

Advantageously, the identification means is arranged to subtract a baseline black level and dark floor current by forming a first image over a first integration time and forming a second image over a second integration time longer than the first integration time and subtracting the first image from the second image.

Advantageously, the identification means is arranged to subtract a baseline black level and dark floor current by forming an original image, Gaussian blurring the original image to form a blurred image and subtracting the blurred image from the original image.

Conveniently, the identification means is arranged to blur the image by Gaussian blurring the image with a filter of radius 16 pixels.

Conveniently, the identification means is arranged to determine the relative gray levels of atypical pixels by applying a gray level threshold at a level at which a predetermined plurality of pixels have gray levels exceeding the threshold and by successively raising the threshold to the gray level of each of the predetermined plurality of pixels to determine the relative gray level of each of the plurality of atypical pixels.

Conveniently, the identification means is arranged to determine the relative gray levels of atypical pixels by applying a gray level threshold at a level at which a predetermined plurality of pixels have gray levels exceeding the threshold and by determining a difference in gray level of each of the atypical pixels compared with an average gray level of pixels adjacent to each of the atypical pixels respectively.

Conveniently, the identification means is arranged to generate a signature by generating a map of the determined locations of the atypical pixels of the at least a portion of the sensor array.

Conveniently, the identification means is arranged to generate a signature by generating a signature from the determined locations of the atypical pixels and relative gray levels of the atypical pixels.

Conveniently, the identification means is arranged to generate a signature, by generating a histogram from the relative gray levels of the atypical pixels.

Conveniently, the identification means is arranged to rank the atypical pixels in order of gray level.

Conveniently, the identification means is arranged to generate a signature by fitting a polynomial equation to dark signal non-uniformity of the image.

Conveniently, the identification means is arranged to store the storable signature by storing associable with the storable signature at least one of a serial number of the sensor, a date of manufacture of the sensor, and a warranty period for the sensor.

Conveniently, the identification means is arranged to store the storable signature by storing associable with the storable signature at least one of drive biases suitable for use with the sensor and image correction information including at least one of dark field, flat field and blemish correction image files.

Conveniently, the identification means is arranged to store the storable signature in a database.

Conveniently, the identification means is arranged to store the storable signature in a database remote from an imaging system to which the sensor is connectable, such that the database is accessible to the imaging system over a communications network.

Conveniently, the identification means is further arranged to generate a new signature of the sensor array; and to match the new signature of the sensor array with the stored signature to identify the sensor array.

Conveniently, the identification means is further arranged to retrieve at least one of a serial number of the sensor, a date of manufacture of the sensor, and a warranty period for the sensor associable with the stored signature.

Conveniently, the identification means is further arranged to retrieve at least one of optimum drive biases suitable for use with the sensor and image correction information including at least one of dark field, flat field and blemish correction image files associable with the storable signature.

According to a second aspect of the invention, there is provided an imaging system comprising identification means to identify a sensor array of photoelectric devices, comprising: read-out means to read out accumulated charge from at least a portion of the sensor array to form an image; feature extraction means to determine, from the image, features of the sensor array comprising at least one of locations of atypical pixels and relative gray levels corresponding to the atypical pixels, in the at least a portion of the sensor array; signature generation means to generate a storable signature of the sensor array from the features of the sensor array; storage means for storing the storable signature; and comparison means to compare the stored signature with a subsequently generated signature for subsequent identification of the sensor array.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the accompanying drawings, in which.

DETAILED DESCRIPTION OF PREFERRED EMBODIMENTS

Throughout the description, identical reference numerals are used to identify like parts.

Figure 1:
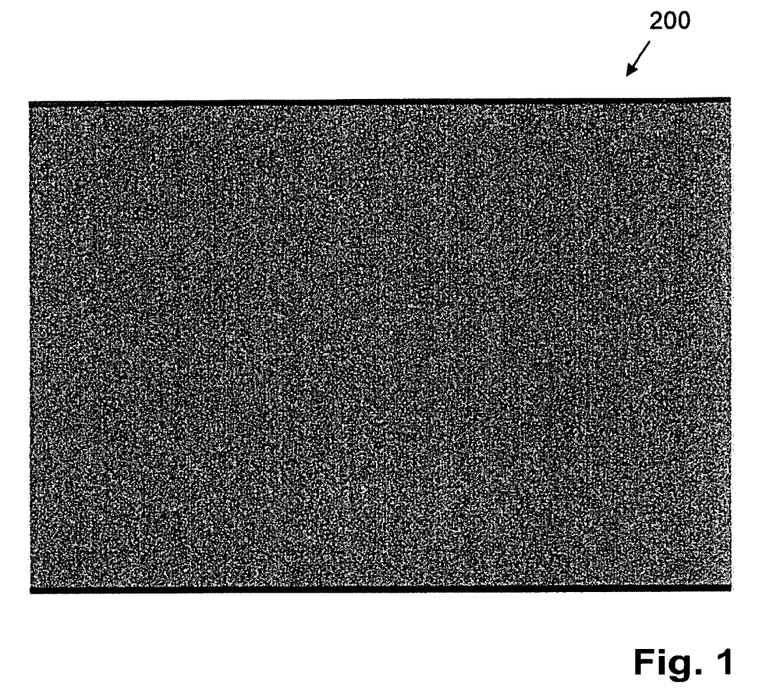
FIG. 1 is a dark image produced by a sensor array, before processing the image according to the present invention.
Figure 2:
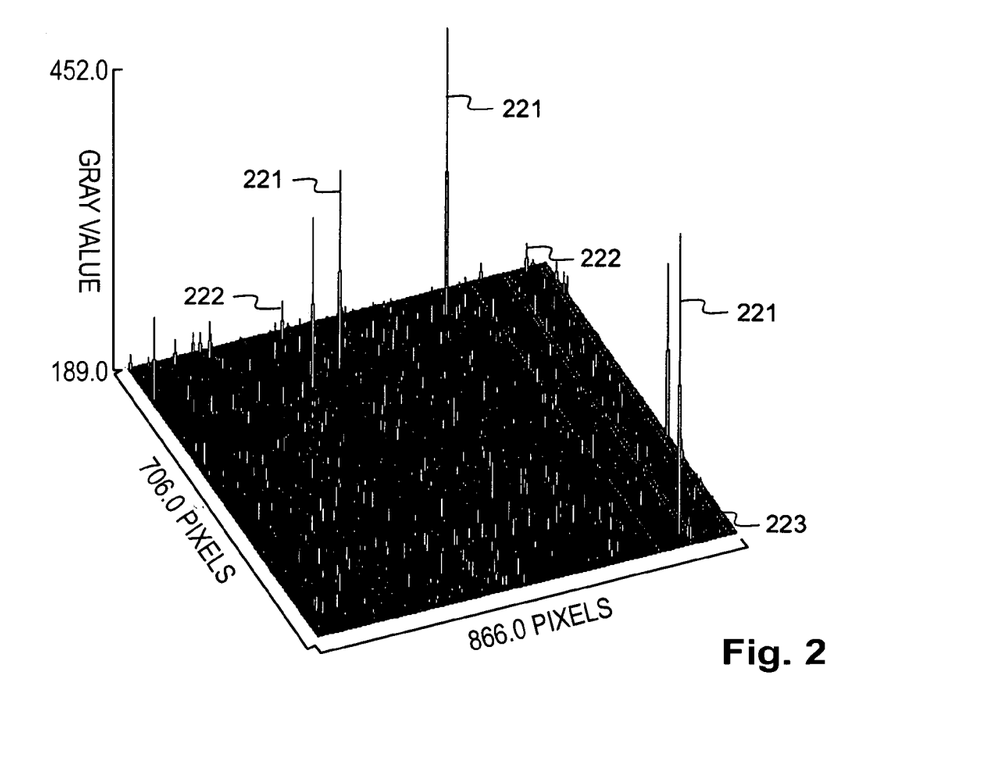
FIG. 2 is a plot of gray values of the image of FIG. 1 after processing according to the present invention to reveal dark signal (DS) spikes.
Figure 3:
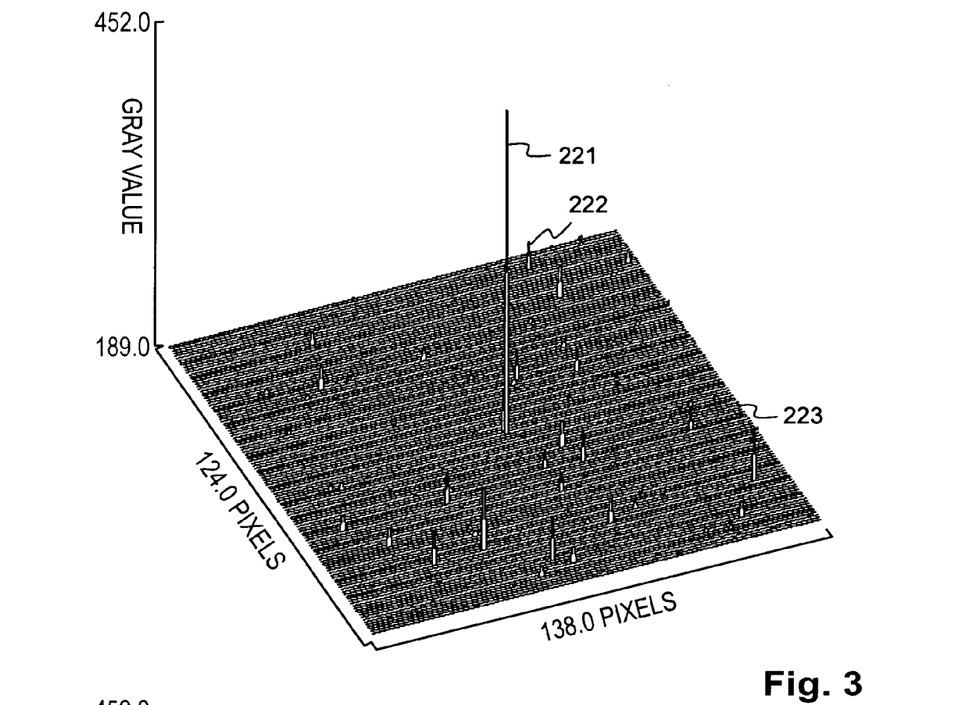
FIG. 3 is a close-up of a high amplitude DS spike, numerous low amplitude spikes and DS background of the plot of gray values of FIG. 2.

Referring to FIG. 1, which shows a dark image 200 produced by a sensor array, a dark current variation of an imaging sensor is characteristic of a particular sensor because the dark current variation is associated with local crystal dislocations in bulk material from which an array of devices of the sensor is constructed. Using suitable signal and software processing, single pixel dark current high points 221, 222, hereinafter called dark current spikes, DS (dark signal) spikes or spikes, as shown in FIG. 2, and area non-uniformity of dark current 223, hereinafter called dark signal non-uniformity (DSNU), can be used to identify a particular imaging sensor uniquely from a number of sensors.

Although dark current spikes may be used to identify an array, in principle, a given image sensor can be identified according to the invention by non-uniformity of a number of different electro-optical aspects of its array, for example, dark signal spikes, dark signal columns, dark signal non-uniformity, fixed traps, signal level dependent traps, photo-response spots, photo-response columns and photo-response non-uniformity. However, the invention is primarily described herein based on x,y mapping of non-uniformities of the dark signal in order to identify a given image sensor.

To obtain a dark image 200, as shown in FIG. 1, charge generated in a CCD array is integrated in darkness for a sufficient time to accumulate a dark image containing moderately high dark current and a number of hot pixel/dark current spikes 221, 222, for example an average dark current of 2% of full well capacity—for an Advanced Inverted Mode Operation (AIMO) device for 5 seconds at 37° C. A resulting image 200 is read out from the array and stored.

Before each use of the sensor in which it is required to identify the sensor, a dark image is again obtained. A general correlation may be expected between the measured dark current image and the previously stored dark current image, with which the measured image may be matched. A matching technique need not be applied to the whole array, but to any predetermined stored portion. For example, a dark current profile of say a first 50 pixels and 50 lines may be matched with a corresponding portion of the previously acquired dark current image. This reduces required mathematical processing and, assuming all sensors to be identified are larger than the portion, say 50 pixels×50 lines, permits matching a sensor without having first to determine an array size of the sensor.

A matching technique need not be applied to the whole array, but to the detection of the most significant atypical pixels, e.g. in terms of single pixel deviation in amplitude from nearest neighbours. In one embodiment, this means detecting the brightest, say 50, pixels in a dark image.

If a selected portion of the sensor fails to produce any match, or fails to produce a unique match, other portions or the whole sensor are subsequently compared.

Various matching techniques may be used to seek to match a stored image to a measured image. The ratio of dark current in a captured image to an original image can be used as an estimator for a scaling factor or a figure of merit as to how close the correlation is expected to be. However, wherever possible, single distinctive pixels are searched out. For example, a threshold is applied to the image at a grey level, A, just above a mean grey level for the whole image, and detected atypical pixels plotted in an x-y table. Alternatively, a maximum grey level of the whole image is detected, then a threshold, B, applied such that 100 'bright' atypical pixels detected and plotted in an x-y table. The use of relative pixel amplitudes is preferred in order to avoid strong dependence on imager temperature. Theoretically, only one previously stored dark current image is needed for each CCD array to be identified. The thresholded images should be a good match to the ones previously stored for the same CCD. Alternatively, only one measured image could be matched against multiple stored images, but that would require storing several dark current images for each CCD array.

An extension of the thresholding method uses dark current images for a range of integration times and thresholds them all at a same level. This may provide extra information to help identification as lower level white defects will then be mapped.

Three basic embodiments are described as examples of suitable processing:

1 Detection of x & y coordinates of spikes and their ranking by amplitude;

2 Calculation of a histogram with bins of relative spike amplitude; and

3 Fitting of a polynomial equation to medium and large area DSNU.

Practically, the first embodiment, detection of x & y coordinates of spikes and their ranking by amplitude, is preferred.

Figure 8:
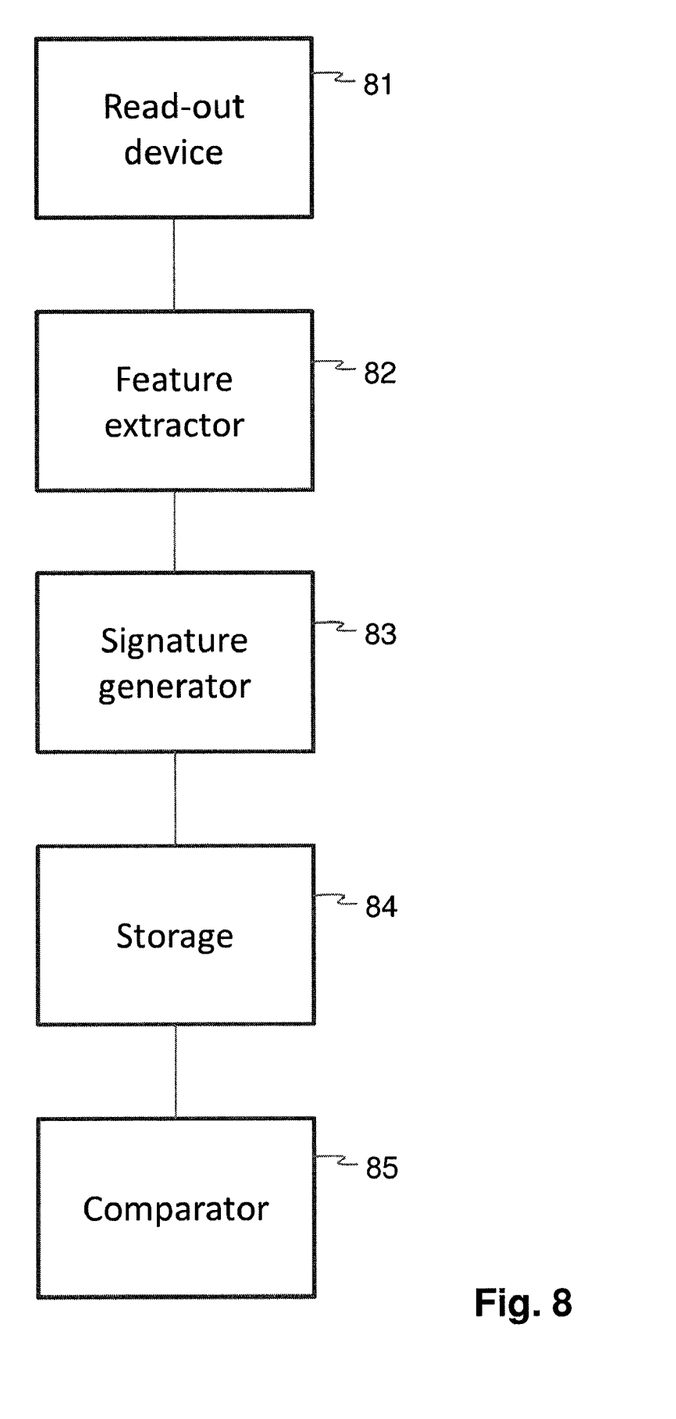
FIG. 8 is a block diagram showing an identification device according to one embodiment of the application.

In all cases, the output of the processing is used to construct a concise dark signal (DS) signature in terms of a series of numbers for a particular sensor, e.g. relative amplitude$_{(spike\ 1)}$, x coordinate$_{(spike\ 1)}$, y coordinate$_{(spike\ 1)}$ . . . x coordinate$_{(spike\ N)}$, y coordinate$_{(spike\ N)}$, relative amplitude$_{(spike\ N)}$ FIG. 8 depicts the identification device for the sensor away of photoelectric devices according to an embodiment of the application. The identification device includes a read-out device 81 that reads out accumulated charge from at least a portion of the sensor array to form an image. A feature extractor 82 of the identification device determines, from the image, features of the sensor array comprising at least one of locations of atypical pixels and relative gray levels corresponding to the atypical pixels, in the at least a portion of the sensor array. The identification device also includes a signature generator 83 which generates a storable signature of the sensor away from the features of the sensor array and a storage 84 to store the storable signature. A comparator 85 of the identification device compares the stored signature with a subsequently generated signature for subsequent identification of the sensor array.

Generation of DS Signatures

In order to generate a DS signature, an imager signal due to dark current must be significantly higher, for example more than three times greater, than readout noise of the imager.

It is also necessary that the dark signal is not so high as to saturate the imager or signal processor, nor so high as to cause significant clipping of DS spikes or imager blooming from DS spike sites.

An integration time for the dark image must be a sufficient time to collect a reasonable amount of dark current. However, in order to hasten signature generation, and to reduce time required for an adequate amount of dark current to build up, it is advantageous temporarily to increase a normal imager dark current by one or more of the following methods:

adjusting bias levels (usually by reducing a substrate voltage);

increasing device temperature; or changing clocking waveforms applied to the imager, e.g. if an AIMO CCD is being used, using Non-Inverted Mode Operation (NIMO) waveforms.

Once the sensor has been identified, normal values of the parameters are used for imaging.

1. Detection of x,y Coordinates of Spikes

Bottom-Up Method

In a bottom-up first embodiment, once a dark image 200 has been generated, a baseline black level and dark current floor are subtracted to allow discrimination of DS spikes 221, 222. This can be done, for example, by one of the following methods:

forming a first image over a very short integration time, e.g. 1 ms, taking a second image at a longer integration time, e.g. 1 s, and subtracting the first image from the second; or taking an original image at a long integration time, e.g. 1 s and Gaussian blurring this image, e.g. with a filter of radius 16 pixels, and subtracting the blurred image from the original image in order to reveal DS spikes.

The whole area average of the image (with baseline previously subtracted) is calculated. A gray level threshold operation is carried out for the image. The threshold is raised from zero gray level until a number of spikes 221, 222 detected is reduced to a number of the order of 100. The gray level threshold is raised further until the lowest of the 100 spikes is just lower than the threshold. The first spike amplitude is then calculated from the formula (current threshold−whole area average). The process is repeated until the positions and amplitudes of all spikes have been measured and recorded.

Figure 5:
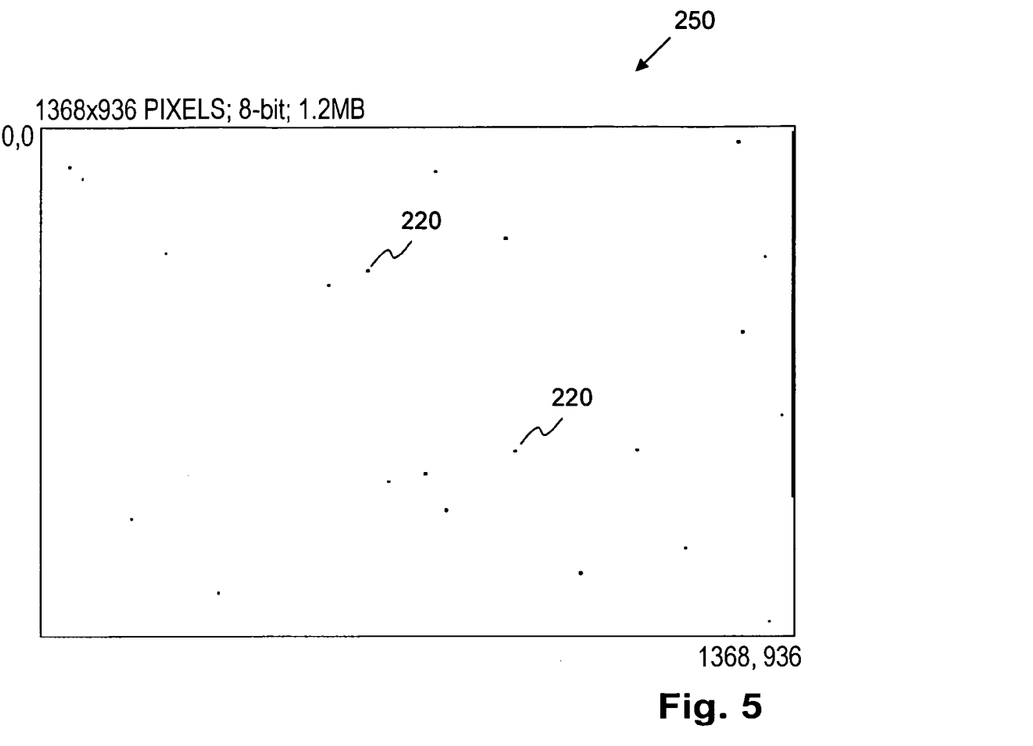
FIG. 5 is a plot of positions of largest amplitude DS spikes in a plot of gray values similar to that of FIG. 2.

FIG. 5 shows an exemplary plot 250 of positions of largest amplitude DS spikes 221 in a plot of gray values, for which the x,y coordinates are determined.

Top-Down Method

In a top-down second embodiment, a threshold operation is carried out for the image. The gray level threshold is reduced from peak white counts until the number of spikes detected is of the order of 100. For each spike detected, the peak amplitude and a local area average of around five pixels radius, centred on the spike, is measured. The amplitude of each spike is calculated as (peak amplitude−local area average).

Column Defect and Edge Effects

Figure 4:
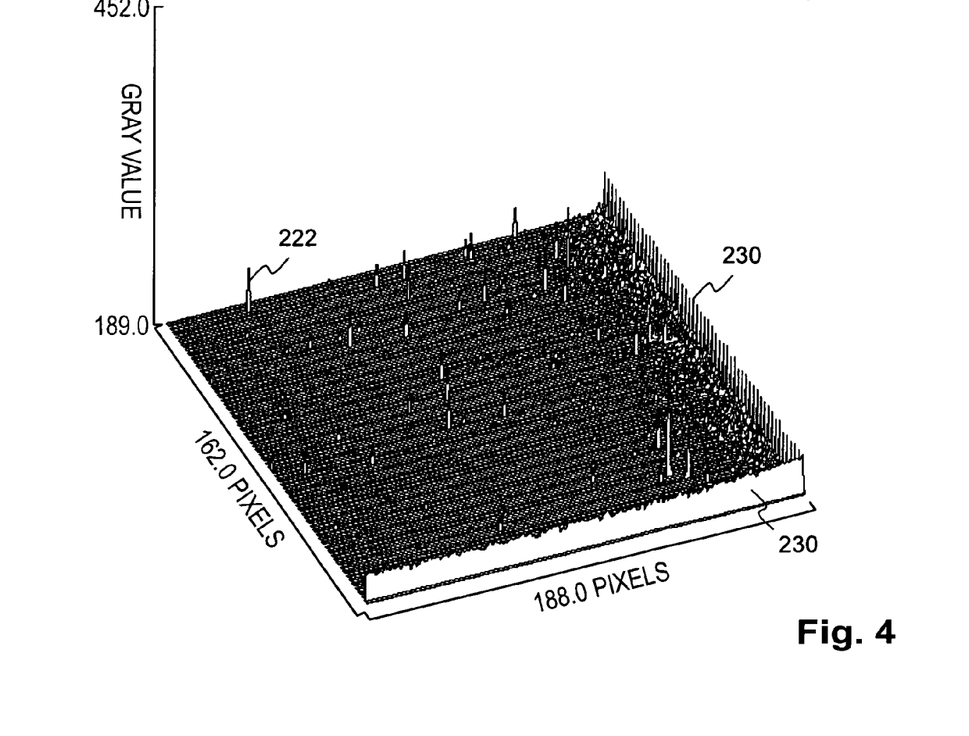
FIG. 4 is close-up of edge effects of the plot of gray values of FIG. 2.

Referring to FIG. 4, an algorithm for counting the spikes 220 should be insensitive to shading 230 at the edges of the image 200, which can be caused by charge leakage. It should also be insensitive to column defects, not shown, where a number (e.g. <10) sensor defects are joined together in a column defect. In preference, the algorithm counts single pixel DS spikes 221, 222 in areas that are known not to be influenced by edge effects 230 or column effects.

2. Calculation of Histogram with Bins of Relative Spike Amplitude

In a third embodiment, a histogram is calculated from the relative amplitudes of the spikes are ranked in order of brightest to least bright pixel, as shown in the following table.

| Spike Ref | Spike Position X | Spike Position Y | Grey Value | Relative Amplitude |
|---|---|---|---|---|
| 1 | 981 | 821 | 522 | 1.00 |
| 2 | 845 | 203 | 440 | 0.70 |
| 3 | 717 | 80 | 403 | 0.56 |
| 4 | 164 | 721 | 400 | 0.55 |
| 5 | 863 | 596 | 394 | 0.53 |
| 6 | 737 | 705 | 389 | 0.51 |
| 7 | 51 | 71 | 386 | 0.50 |
| 8 | 593 | 263 | 363 | 0.41 |
| 9 | 1273 | 377 | 352 | 0.37 |
| 10 | 631 | 652 | 343 | 0.34 |
| 11 | 1083 | 594 | 340 | 0.33 |
| 12 | 521 | 290 | 338 | 0.32 |
| 13 | 1265 | 27 | 332 | 0.30 |
| 14 | 322 | 857 | 308 | 0.21 |
| 15 | 1322 | 910 | 287 | 0.13 |
| 16 | 1314 | 238 | 271 | 0.07 |
| 17 | 226 | 230 | 264 | 0.05 |
| 18 | 74 | 92 | 257 | 0.02 |
| 19 | 699 | 637 | 256 | 0.02 |
| 20 | 1171 | 775 | 256 | 0.02 |
| 21 | 1346 | 530 | 251 | 0.00 |

From this table a dark signal signature may be derived from the relative amplitudes and (x,y) coordinates of the spikes ranked in order of relative amplitude: DS Signature=1.0, 981, 821, 0.7, 845, 203, 0.56, 717, 80 . . . 0.0, 1346, 530)

Further aspects of the image may be used to check the correctness of the Spike Position table. For example:

X max: 1368: maximum pixel number in the x direction for the known sensor

Y max: 936: maximum pixel number in the y direction for the known sensor

Grey max: 4096: number of bits of the A to D

Standard deviation: 3.36

Mean: 182: check that no spike is less than (mean+3×std dev=192.1)

Max: 522: check no spike exceeds this value

Figure 6:
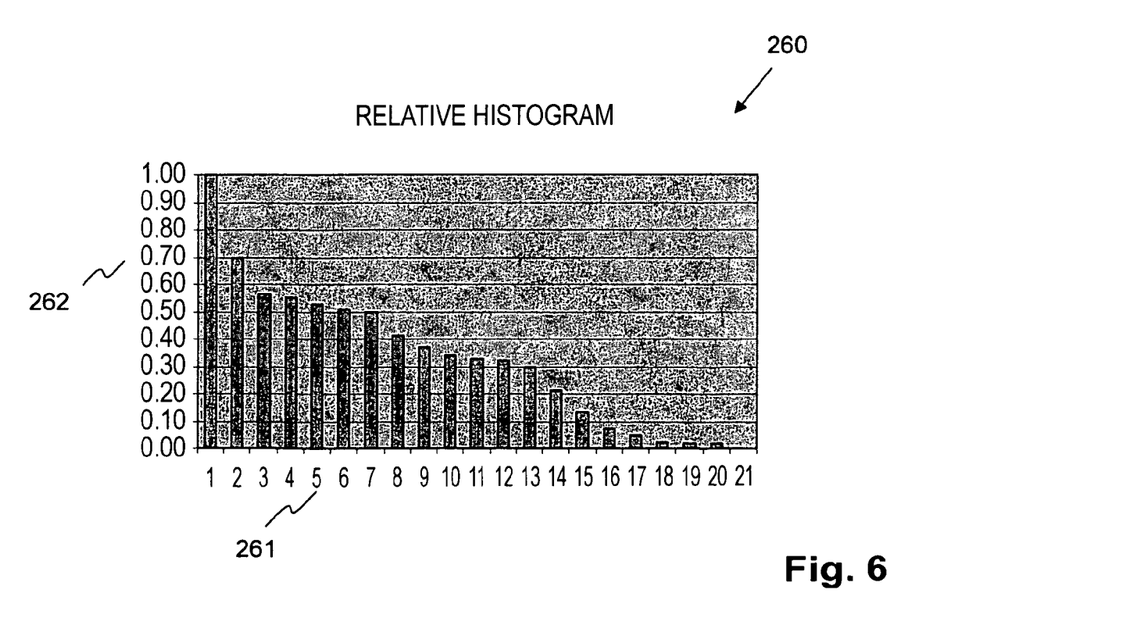
FIG. 6 is a relative histogram of relative amplitudes of atypical pixels in the plot of FIG. 2.

A table of x,y coordinates and spike amplitude results from the embodiment described above. In this third embodiment, this data is re-ordered to construct a histogram 260, see FIG. 6, with spikes 261 from lowest to highest relative spike amplitude 262. Alternatively, the data is allocated to relative spike amplitude ranges or bins to construct a frequency histogram with say 20 bins from lowest to highest relative spike amplitude. The use of relative spike amplitudes is important in order to avoid a necessity of scaling spike amplitude with temperature.

In a related embodiment, relative spike amplitudes may be serially calculated on the fly.

3. Fitting of Polynomial Equation to Medium and Large Area DSNU

In a fourth embodiment, a polynomial equation is fitted to medium or large area DSNU 223. A first image is formed over a very short integration time, e.g. 1 ms, and a second image formed over a longer integration time, e.g. 1 s and the first image is subtracted from the second image.

Row Profile

Figure 7:
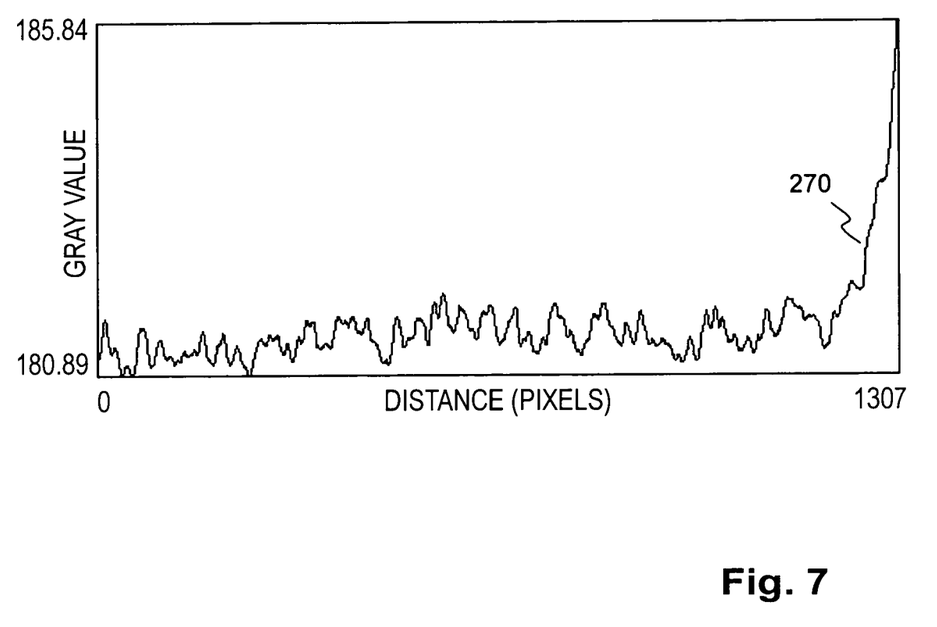
FIG. 7 is a DSNU row profile of distance in pixels as abscissa and gray value as ordinates of the plot of FIG. 2.

Column binning may be used, i.e. combining data from adjacent pixels in a column direction, in order to reduce effects of noise. Typically column binning will be 10 to 100 pixels high. A polynomial equation is fitted to the resulting row profile 270, as shown in FIG. 7.

Column Profile

Alternatively, row binning may be used, i.e. combining data from adjacent pixels in a row direction, in order to reduce effects of noise. Typically row binning will be 10 to 100 pixels high.

A linear equation is fitted to the dark current ramp that results from pixels read out later from the array that contains greater dark signal. This dark current ramp is subtracted from the image. A polynomial equation is fitted to the column profile.

Use of DS Signatures to Identify an Imager

The probability of the x,y coordinates of spikes identifying a particular imager increases rapidly with the number of spikes. Although around 100 spikes are mapped for each device, a match on a first 10 to 50 spikes will usually be sufficient. If matching all 100 spikes is inconclusive, further matching using one or both of the third embodiment of using histograms and the fourth embodiment of fitting polynomials can also be used.

When an imaging device of unknown serial number is connected to the imaging system, a dark image is first generated, which is then processed to give the DS signature. This DS signature is then compared with local or remote databases/lookup tables in order to identify the device uniquely.

Once identified, the device can then be associated with information such as date of manufacture, warranty remaining, drive biases required etc. It can also be associated with image correction information such as dark field, flat field and blemish correction image files.

Once the processing has been implemented at both the point of manufacture and the point of use, the system is more economical to run, less prone to errors, e.g. resulting from repetitive programming, and more flexible than other systems that, for example, use a serial EEPROM attached to the imaging device to store serial number data.

The DS signature method of the invention is usable in combination with conventional printed labelling or EEPROM identification as a backup or check to confirm that an imager does have the correct serial number. The DS signature is intrinsic to the imaging device alone.

The DS signature is compact, and is generated by a method which can be easily automated, is fast, and does not require the storage of large image files to identify a particular imager uniquely.

Once a particular CCD serial number has been identified, the stored dark field and bright field image data is used to correct subsequent images by appropriate processing in a known manner.

It will be understood that the method is applicable to CCD arrays in which pixels are in patterns other than a standard rectangular array.

It will be further understood that the method is also applicable to other sensor types such as CMOS device sensors.

Whilst dark current is a convenient way of gathering signal charge, since it is inherent in silicon of the array, an array may be identified if signal charge is generated in the array by some other technique, for example, light could briefly be produced over the area of the sensor, by pulsing an LED or opening a shutter, or, for a dental x-ray sensor with a phosphor, by stimulating the phosphor, by light or by passing an electric current through the phosphor.

It will be understood that where a plurality of sensor arrays are to be used with an imaging system, as, for example, in a dental surgery, maps of atypical pixels of all the sensor arrays to be used with the imaging system may be stored in the imaging system. Alternatively, maps of atypical pixels may be stored centrally in a database and the maps accessed over a communications network, for example the maps may be stored on a website and accessed using the Internet. Alternatively, or in addition, a manufacturer may have a map database of all devices manufactured in a given time period so that any device returned to the manufacturer, for example as being defective during a warranty period, may be uniquely identified, for example to determine whether the device is covered by warranty or to identify a manufacturing batch number, for example, for a possible product recall or quality control investigation.

Alternative embodiments of the invention can be implemented as a computer program product for use with a computer system, the computer program product being, for example, a series of computer instructions stored on a tangible data a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

Although the invention has been described in terms of pixels which are atypical by virtue of their dark current, it will be understood that the invention is equally applicable to the location of any distinctive pixels within the array which may be consistently mapped.

Although the present invention has been described with reference to preferred embodiments, workers skilled in the art will recognize that changes may be made in form and detail without departing from the spirit and scope of the invention.

We claim:

1. An identification device for a sensor array of photoelectric devices, comprising:
    a read-out device to read out accumulated charge from at least a portion of the sensor array to form an image;
    a feature extractor to determine, from the image, features of the sensor array comprising at least one of locations of atypical pixels and relative gray levels corresponding to the atypical pixels, in the at least a portion of the sensor array;
    a signature generator to generate a storable signature of the sensor away from the features of the sensor array;
    a storage for storing the storable signature; and
    a comparator to compare the stored signature with a subsequently generated signature for subsequent identification of the sensor array.

2. The identification device according to claim 1, arranged to accumulate charge from a dark current.

3. The identification device according to claim 1, arranged to increase dark current by at least one of adjusting bias levels applied to the sensor array, increasing a temperature of the sensor away and applying adapted clocking waveforms.

4. The identification device according to claim 1, arranged to determine locations of atypical pixels by subtracting a baseline black level and a dark current floor from the image.

5. The identification device according to claim 4, arranged to subtract a baseline black level and dark floor current by forming a first image over a first integration time and forming a second image over a second integration time longer than the first integration time and subtracting the first image from the second image.

6. The identification device according to claim 4, arranged to subtract a baseline black level and dark floor current by forming an original image, Gaussian bluffing the original image to form a bluffed image and subtracting the blurred image from the original image.

7. The identification device according to claim 6, arranged to blur the original image by Gaussian bluffing the original image with a filter of radius 16 pixels.

8. The identification device according to claim 1, arranged to determine the relative gray levels of atypical pixels by applying a gray level threshold at a level at which a predetermined plurality of pixels have gray levels exceeding the threshold and by successively raising the threshold to the gray level of each of the predetermined plurality of pixels to determine the relative gray level of each of the plurality of atypical pixels.

9. The identification device according to claim 1, arranged to determine the relative gray levels of atypical pixels by applying a gray level threshold at a level at which a predetermined plurality of pixels have gray levels exceeding the threshold and by determining a difference in gray level of each of the atypical pixels compared with an average gray level of pixels adjacent to each of the atypical pixels respectively.

10. The identification device according to claim 1, arranged to generate a signature by generating a map of the determined locations of the atypical pixels of the at least a portion of the sensor array.

11. The identification device according to claim 1, arranged to generate a signature by generating a signature from the determined locations of the atypical pixels and relative gray levels of the atypical pixels.

12. The identification device according to claim 1, arranged to generate a signature, by generating a histogram from the relative gray levels of the atypical pixels.

13. The identification device according to claim 11, arranged to rank the atypical pixels in order of gray level.

14. The identification device according to claim 1, arranged to generate a signature by fitting a polynomial equation to dark signal non-uniformity of the image.

15. The identification device according to claim 1, arranged to store the storable signature by storing associable with the storable signature at least one of a serial number of the sensor, a date of manufacture of the sensor, and a warranty period for the sensor.

16. The identification device according to claim 1, arranged to store the storable signature by storing associable with the storable signature at least one of drive biases suitable for use with the sensor and image correction information including at least one of dark field, flat field and blemish correction image files.

17. The identification device according to claim 1, arranged to store the storable signature in a database.

18. The identification device according to claim 17, arranged to store the storable signature in a database remote from an imaging system to which the sensor is connectable, such that the database is accessible to the imaging system over a communications network.

19. The identification device according to claim 1, further arranged to generate a new signature of the sensor array; and to match the new signature of the sensor array with the stored signature to identify the sensor array.

20. The identification device according to claim 19, further arranged to retrieve at least one of a serial number of the sensor, a date of manufacture of the sensor, and a warranty period for the sensor as sociable with the stored signature.

21. The identification device according to claim 19, further arranged to retrieve at least one of optimum drive biases suitable for use with the sensor and image correction information including at least one of dark field, flat field and blemish correction image files associable with the storable signature.

22. An imaging system comprising an identification device to identify a sensor away of photoelectric devices, comprising:
- a read-out device to read out accumulated charge from at least a portion of the sensor array to form an image;
- a feature extractor to determine, from the image, features of the sensor array comprising at least one of locations of atypical pixels and relative gray levels corresponding to the atypical pixels, in the at least a portion of the sensor array;
- a signature generator to generate a storable signature of the sensor array from the features of the sensor array;
- a storage for storing the storable signature; and
- a comparator to compare the stored signature with a subsequently generated signature for subsequent identification of the sensor array.

* * * * *

UNITED STATES PATENT AND TRADEMARK OFFICE
CERTIFICATE OF CORRECTION

PATENT NO. : 7,747,081 B2
APPLICATION NO. : 11/394214
DATED : June 29, 2010
INVENTOR(S) : Moody et al.

It is certified that error appears in the above-identified patent and that said Letters Patent is hereby corrected as shown below:

In the Specification:

Column 2, line 12, replace "away" with --array--

Line 19, replace "away" with --array--

Line 28, after "increasing a", insert --temperature of the sensor array and applying adapted clocking waveforms.--

Column 5, line 47, replace "away" with --array--

Line 58, replace "away" with --array--

In the Claims:

Claim 1, Column 9, line 51, replace "away" with --array--

Claim 3, Column 9, line 61, replace "away" with --array--

Claim 22, Column 11, line 10, replace "away" with --array--.

Signed and Sealed this

Seventh Day of September, 2010

David J. Kappos
*Director of the United States Patent and Trademark Office*